(12) United States Patent
Balakrishnan et al.

(10) Patent No.: US 12,111,825 B2
(45) Date of Patent: Oct. 8, 2024

(54) EVENT-DRIVEN BATCH PROCESSING SYSTEM WITH GRANULAR OPERATIONAL ACCESS

(71) Applicant: BANK OF AMERICA CORPORATION, Charlotte, NC (US)

(72) Inventors: Prajith Rugmini Balakrishnan, Jacksonville, FL (US); Anurag Prakash Varde, Jacksonville, FL (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/984,568

(22) Filed: Nov. 10, 2022

(65) Prior Publication Data

US 2024/0160625 A1    May 16, 2024

(51) Int. Cl.
*G06F 16/23*    (2019.01)
*G06F 16/26*    (2019.01)

(52) U.S. Cl.
CPC ...... *G06F 16/2386* (2019.01); *G06F 16/2358* (2019.01); *G06F 16/26* (2019.01)

(58) Field of Classification Search
CPC ... G06F 16/2386; G06F 16/26; G06F 16/2358
See application file for complete search history.

(56) References Cited

U.S. PATENT DOCUMENTS

| | | |
|---|---|---|
| 5,493,689 A | 2/1996 | Waclawsky |
| 5,940,813 A | 8/1999 | Hutchings |
| 6,213,652 B1 * | 4/2001 | Suzuki ................. G06F 21/608 358/1.15 |
| 6,894,792 B1 * | 5/2005 | Abe ...................... G06F 3/1207 358/1.14 |
| 6,976,022 B2 * | 12/2005 | Vemuri ............... G06F 16/2365 |
| 6,978,422 B1 * | 12/2005 | Bushe ..................... G06F 9/451 715/734 |

(Continued)

FOREIGN PATENT DOCUMENTS

| | | |
|---|---|---|
| WO | 2018188959 A1 | 10/2018 |
| WO | 2021032056 A1 | 2/2021 |
| WO | 2023221370 A1 | 11/2023 |

OTHER PUBLICATIONS

Roth et al., "Event Data Warehousing for Complex Event Processing", IEEE (Year: 2010).*

*Primary Examiner* — Irete F Ehichioya
*Assistant Examiner* — Huen Wong
(74) *Attorney, Agent, or Firm* — Moore & Van Allen PLLC; Anup Shrinivasan Iyer

(57) ABSTRACT

Systems, computer program products, and methods are described herein for event-driven batch processing with granular operational access. The present disclosure is configured to retrieve, from one or more feature databases, one or more attributes to process one or more records associated with a first batch cycle; retrieve, from one or more configuration databases, one or more resources associated with the one or more records; generate a dashboard interface for the one or more records, wherein the dashboard interface comprises the one or more attributes, the one or more resources, and one or more operational access parameters associated with the processing of the one or more records; and provide, to a user input device associated with a user, the dashboard interface.

18 Claims, 5 Drawing Sheets

(56) References Cited

U.S. PATENT DOCUMENTS

| | | | |
|---|---|---|---|
| 7,249,356 B1* | 7/2007 | Wilson | G05B 23/0264 700/87 |
| 7,353,196 B1 | 4/2008 | Bobbitt | |
| 7,526,487 B1 | 4/2009 | Bobbitt | |
| 7,664,720 B1* | 2/2010 | Freeman | G06F 3/0481 706/45 |
| 7,698,209 B1* | 4/2010 | Zhao | G06Q 40/00 705/37 |
| 7,849,994 B2* | 12/2010 | Klein | G06Q 40/12 270/52.02 |
| 7,920,983 B1* | 4/2011 | Peleg | G06Q 10/06 702/50 |
| 8,495,136 B2 | 7/2013 | Dario | |
| 8,584,124 B2 | 11/2013 | Fee | |
| 9,516,053 B1* | 12/2016 | Muddu | G06F 3/0484 |
| 9,760,871 B1* | 9/2017 | Pourfallah | G06Q 10/10 |
| 10,409,654 B2 | 9/2019 | Behrendt | |
| 10,459,938 B1* | 10/2019 | Agnew | G06F 3/0482 |
| 10,678,597 B2 | 6/2020 | Wang | |
| 10,895,972 B1* | 1/2021 | Apostolatos | G06F 3/04847 |
| 10,970,141 B2 | 4/2021 | Gokavarapu | |
| 11,106,442 B1* | 8/2021 | Hsiao | H04L 67/02 |
| 11,405,549 B2* | 8/2022 | Cier | H04N 5/265 |
| 11,706,280 B2 | 7/2023 | Ibryam | |
| 2003/0065759 A1 | 4/2003 | Britt | |
| 2004/0088406 A1* | 5/2004 | Corley | H04L 41/064 709/224 |
| 2005/0100203 A1* | 5/2005 | Fujisawa | G06T 7/66 382/130 |
| 2005/0168595 A1* | 8/2005 | White | G06T 5/75 348/222.1 |
| 2006/0139031 A1* | 6/2006 | Kalokitis | G01R 29/0878 324/457 |
| 2008/0015944 A1* | 1/2008 | Nose | G06Q 30/0601 705/26.1 |
| 2008/0263453 A1* | 10/2008 | Aggarwal | G06Q 10/06 715/735 |
| 2009/0113244 A1* | 4/2009 | Doshi | H04W 24/08 714/25 |
| 2009/0217272 A1* | 8/2009 | Bortnikov | G06F 9/4843 718/101 |
| 2010/0058220 A1* | 3/2010 | Carpenter | G06Q 30/02 715/772 |
| 2012/0137367 A1* | 5/2012 | Dupont | G06F 21/00 726/25 |
| 2012/0253972 A1* | 10/2012 | Oskolkov | G06Q 30/06 705/26.8 |
| 2013/0278745 A1* | 10/2013 | Kamio | H01J 37/244 348/80 |
| 2014/0074889 A1* | 3/2014 | Neels | G06F 3/0482 707/779 |
| 2014/0201838 A1* | 7/2014 | Varsanyi | G06F 21/552 726/23 |
| 2014/0244528 A1* | 8/2014 | Zhang | G06Q 40/02 705/318 |
| 2015/0293954 A1* | 10/2015 | Hsiao | G06F 16/22 715/738 |
| 2016/0316169 A1* | 10/2016 | Eguchi | H04N 21/47 |
| 2017/0063908 A1* | 3/2017 | Muddu | G06N 20/20 |
| 2017/0097849 A1 | 4/2017 | Lowery | |
| 2017/0192872 A1* | 7/2017 | Awad | G06F 18/2433 |
| 2017/0322993 A1* | 11/2017 | Brodt | G06F 16/252 |
| 2018/0075099 A1* | 3/2018 | Park | G06F 16/113 |
| 2018/0089290 A1* | 3/2018 | Haggie | G06F 16/285 |
| 2018/0089328 A1* | 3/2018 | Bath | G06F 16/9538 |
| 2018/0101607 A1* | 4/2018 | Yoon | G06F 11/3006 |
| 2018/0129744 A1* | 5/2018 | George | H04L 67/535 |
| 2018/0217910 A1* | 8/2018 | Yang | G06F 11/3006 |
| 2018/0218269 A1* | 8/2018 | Oliner | G06F 16/26 |
| 2019/0155809 A1* | 5/2019 | Shankar | H04W 4/38 |
| 2019/0258677 A1* | 8/2019 | Beedgen | G06F 7/00 |
| 2020/0258104 A1* | 8/2020 | Li | H04L 51/18 |
| 2021/0004874 A1* | 1/2021 | Bur | G06F 3/0484 |
| 2021/0019289 A1* | 1/2021 | Pang | G06F 16/2477 |
| 2021/0373949 A1 | 12/2021 | Sura | |
| 2021/0385378 A1* | 12/2021 | Cier | H04N 5/265 |
| 2022/0012050 A1 | 1/2022 | Zhang | |
| 2022/0027195 A1 | 1/2022 | Marinelli, III | |
| 2022/0075613 A1* | 3/2022 | Ramachandran | G06F 9/45558 |
| 2022/0327113 A1* | 10/2022 | Beedgen | G06F 16/24 |
| 2022/0391398 A1 | 12/2022 | Batchu | |
| 2023/0237566 A9 | 7/2023 | Chowdhary | |

* cited by examiner

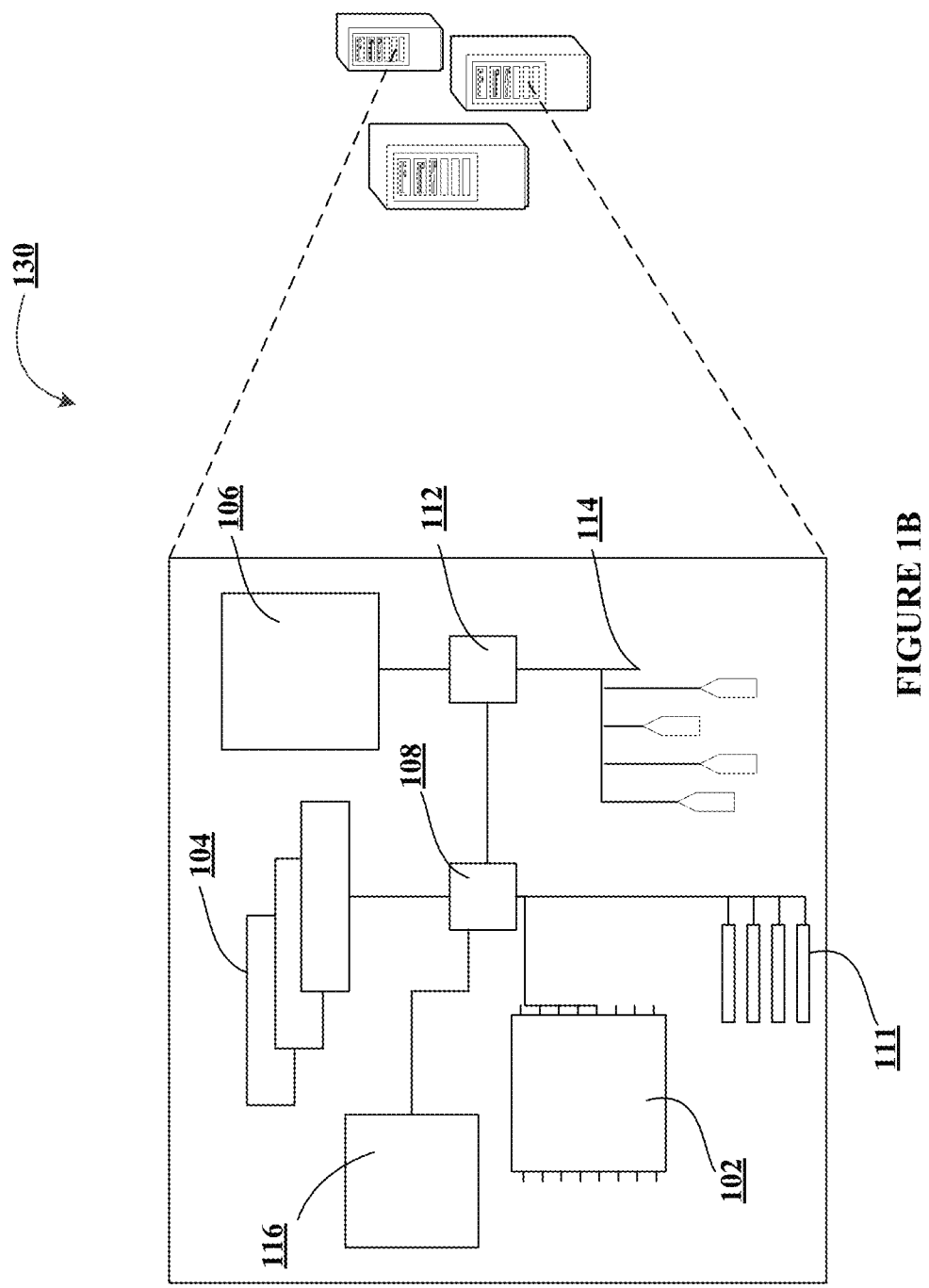

EVENT-DRIVEN BATCH PROCESSING SYSTEM WITH GRANULAR OPERATIONAL ACCESS

TECHNOLOGICAL FIELD

Example embodiments of the present disclosure relate to an event-driven batch processing system with granular operational access.

BACKGROUND

Batch processing is a method of running high-volume, repetitive data jobs. The batch method allows users to process data when computing resources are available, and with little or no user interaction. With batch processing, users collect and store data, and then process the data during an event known as a "batch window." Batch processing improves efficiency by setting processing priorities and completing data jobs at a time that makes the most sense.

Applicant has identified a number of deficiencies and problems associated with batch processing systems. Through applied effort, ingenuity, and innovation, many of these identified problems have been solved by developing solutions that are included in embodiments of the present disclosure, many examples of which are described in detail herein

BRIEF SUMMARY

Systems, methods, and computer program products are provided for event-driven batch processing with granular operational access.

In one aspect, a system for event-driven batch processing with granular operational access is presented. The system comprising: a non-transitory storage device; and a processor coupled to the non-transitory storage device, wherein the processor is configured to: retrieve, from one or more feature databases, one or more attributes to process one or more records associated with a first batch cycle; retrieve, from one or more configuration databases, one or more resources associated with the one or more records; generate a dashboard interface for the one or more records, wherein the dashboard interface comprises the one or more attributes, the one or more resources, and one or more operational access parameters associated with the processing of the one or more records; and provide, to a user input device associated with a user, the dashboard interface.

In some embodiments, the processor is further configured to: receive an incidence of a trigger event; automatically initiate the first batch cycle to process the one or more records; and generate a status associated with the processing of the one or more records.

In some embodiments, the processor is further configured to: update the dashboard interface in response to initiating the first batch cycle to indicate the status associated with the processing of the one or more records.

In some embodiments, the processor is further configured to: receive, from the user input device and via the dashboard interface, a user input to manually interrupt a processing of the first record; interrupt the processing of the first record while continuing to process other records in the first batch cycle; and automatically update a status associated with the processing of the first record to reflect manual intervention from the user.

In some embodiments, the one or more configuration databases comprises at least an event driver database, a billing guideline database, and/or an event configuration database.

In some embodiments, the one or more attributes comprises at least an account attribute, grouping information, artifact information, and/or scheduling information.

In some embodiments, the processor is further configured to: process the one or more records associated with the first batch cycle; capture information associated with the processing of the one or more records; and store the information associated with the processing of the one or more records in an event detail database.

In some embodiments, in processing the one or more records, the processor is further configured to: determine one or more processing types associated with the one or more records; and process the one or more records based on at least the associated processing type.

In some embodiments, the one or more processing types comprises at least new enrollments, terminations, manual entry, adjustments, bulk uploads, and/or regular processing.

In another aspect, a computer program product for event-driven batch processing with granular operational access is presented. The computer program product comprising a non-transitory computer-readable medium comprising code causing an apparatus to: retrieve, from one or more feature databases, one or more attributes to process one or more records associated with a first batch cycle; retrieve, from one or more configuration databases, one or more resources associated with the one or more records; generate a dashboard interface for the one or more records, wherein the dashboard interface comprises the one or more attributes, the one or more resources, and one or more operational access parameters associated with the processing of the one or more records; and provide, to a user input device associated with a user, the dashboard interface.

In yet another aspect, a method for event-driven batch processing with granular operational access is presented. The method comprising: retrieving, from one or more feature databases, one or more attributes to process one or more records associated with a first batch cycle; retrieving, from one or more configuration databases, one or more resources associated with the one or more records; generating a dashboard interface for the one or more records, wherein the dashboard interface comprises the one or more attributes, the one or more resources, and one or more operational access parameters associated with the processing of the one or more records; and providing, to a user input device associated with a user, the dashboard interface.

The above summary is provided merely for purposes of summarizing some example embodiments to provide a basic understanding of some aspects of the present disclosure. Accordingly, it will be appreciated that the above-described embodiments are merely examples and should not be construed to narrow the scope or spirit of the disclosure in any way. It will be appreciated that the scope of the present disclosure encompasses many potential embodiments in addition to those here summarized, some of which will be further described below.

BRIEF DESCRIPTION OF THE DRAWINGS

Having thus described embodiments of the disclosure in general terms, reference will now be made the accompanying drawings. The components illustrated in the figures may or may not be present in certain embodiments described herein. Some embodiments may include fewer (or more) components than those shown in the figures.

Figure 1A:
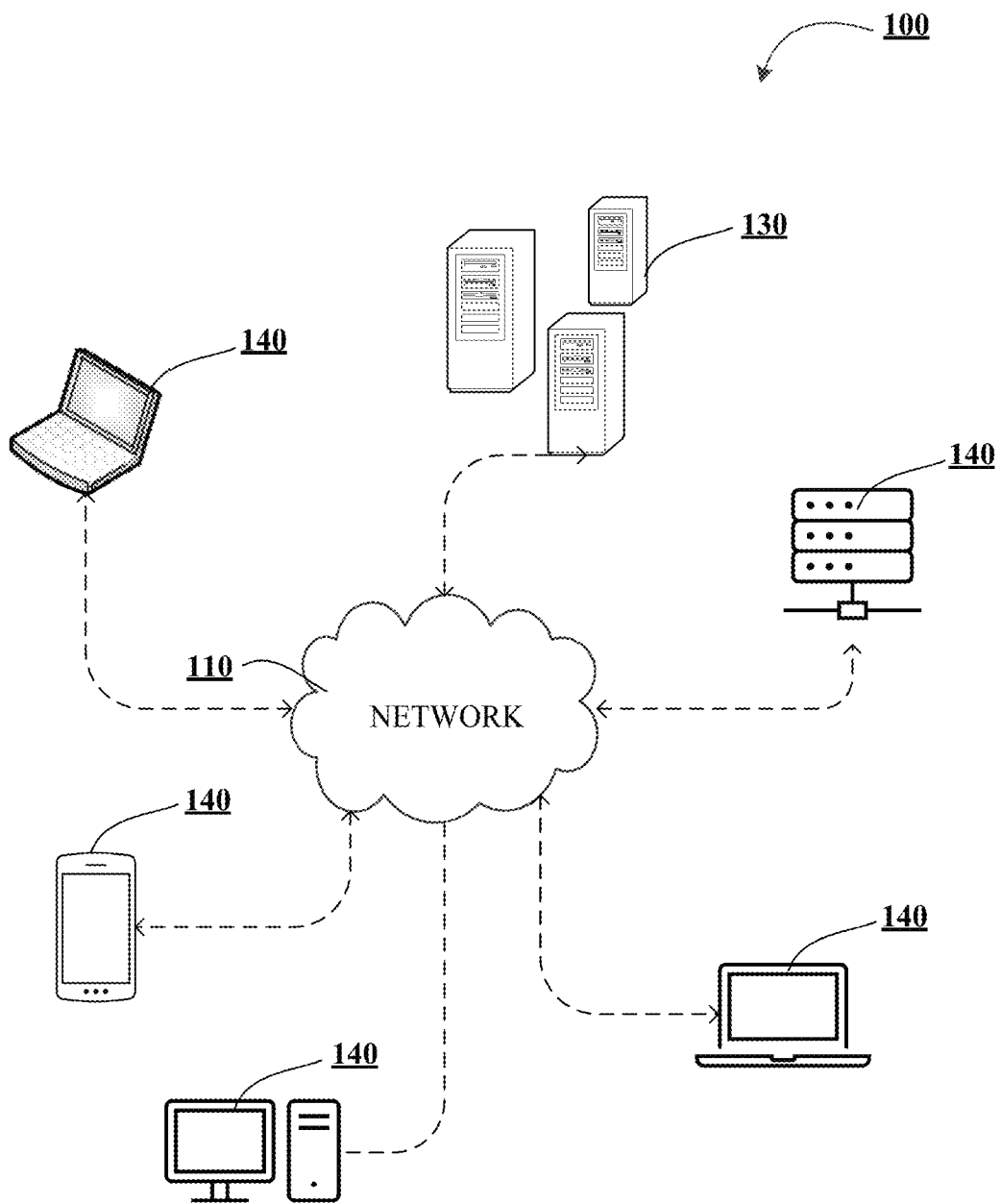
Figure 1C:
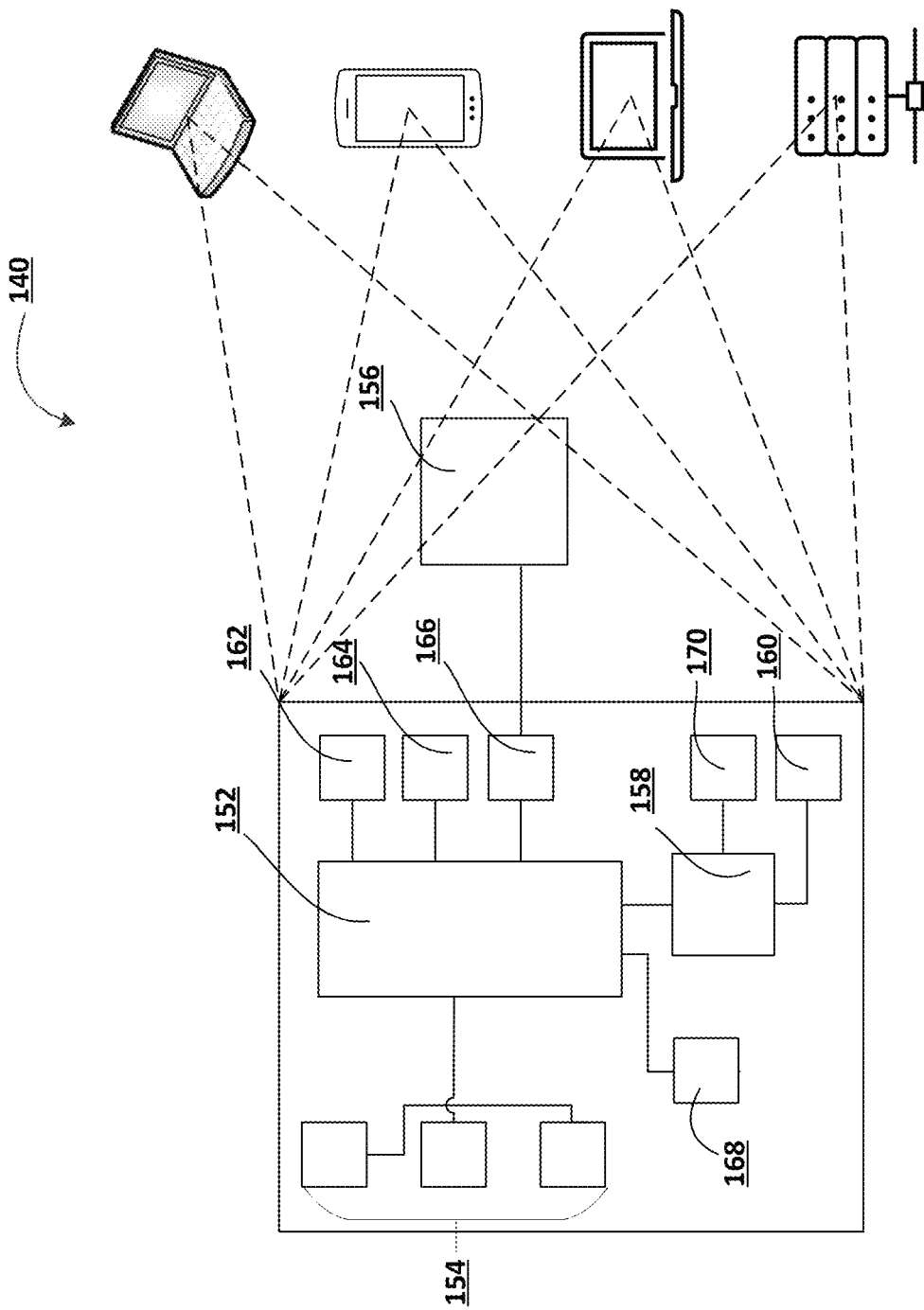
Figure 2:
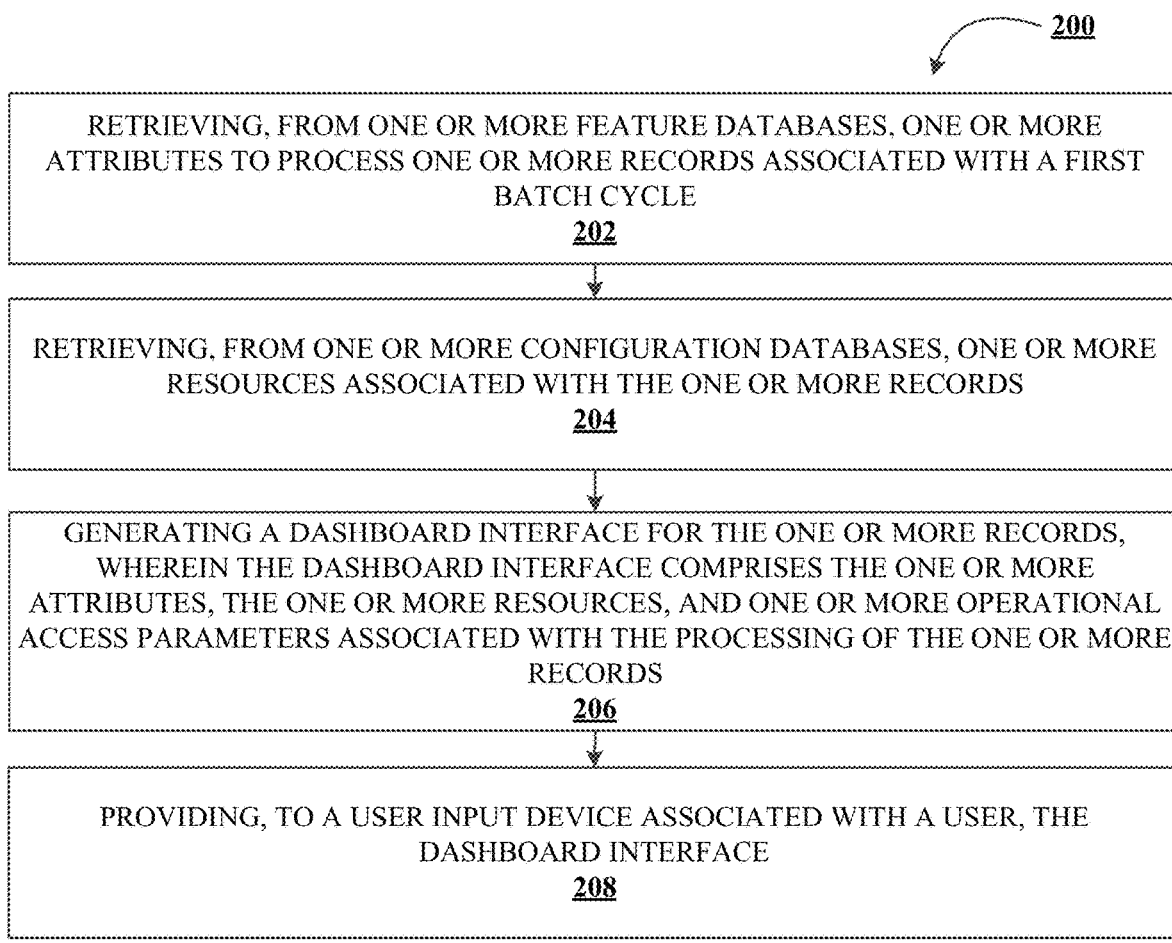

FIGS. 1A-1C illustrates technical components of an exemplary distributed computing environment for event-driven batch processing with granular operational access, in accordance with an embodiment of the disclosure;

FIG. 2 illustrates a method for event-driven batch processing with granular operational access, in accordance with an embodiment of the disclosure.

Figure 3:
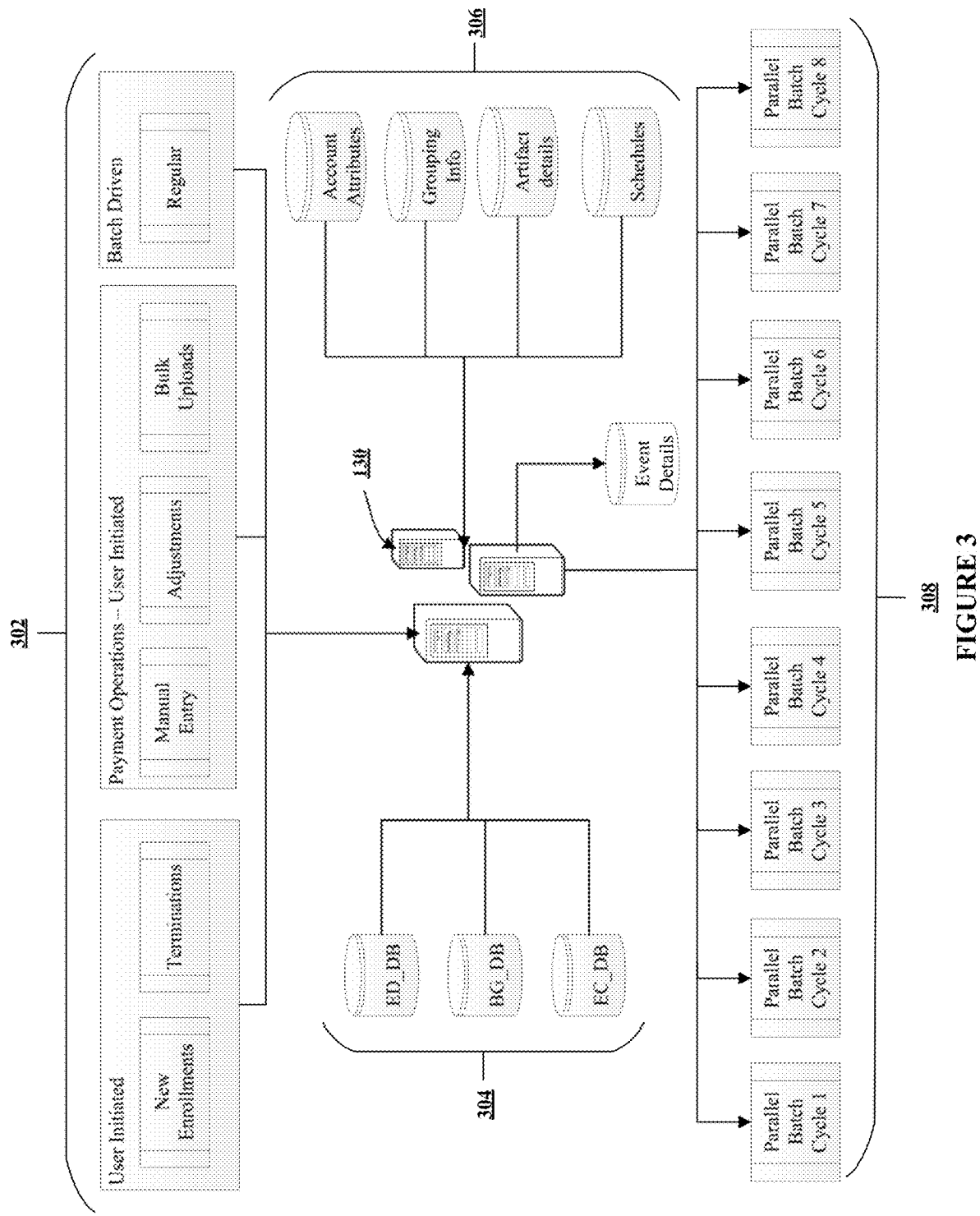

FIG. 3 illustrates a data flow diagram for event-driven batch processing with granular operational access, in accordance with an embodiment of the disclosure.

DETAILED DESCRIPTION

Embodiments of the present disclosure will now be described more fully hereinafter with reference to the accompanying drawings, in which some, but not all, embodiments of the disclosure are shown. Indeed, the disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally-controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, one or more devices, nodes, clusters, or systems within the distributed computing environment described herein. For example, an interaction may refer to a transfer of data between devices, an accessing of stored data by one or more nodes of a computing cluster, a transmission of a requested task, or the like.

It should be understood that the word "exemplary" is used herein to mean "serving as an example, instance, or illustration." Any implementation described herein as "exemplary" is not necessarily to be construed as advantageous over other implementations.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

Batch processing is a method of running high-volume, repetitive data jobs. The batch method allows users to process data when computing resources are available, and with little or no user interaction. With batch processing, users collect and store data, and then process the data during an event known as a "batch window." Batch processing improves efficiency by setting processing priorities and completing data jobs at a time that makes the most sense. However, the once a batch cycle is initiated, users have little to no insight over the specific data jobs being executed within each batch. Moreover, users are unable to pause, terminate, advance, or modify specific data jobs when the batch cycle is initiated. In instances where the batch cycle is interrupted due to unforeseen issues, the entire cycle must be re-run once the issue is addressed as the current architecture does not have the flexibility to resume batch cycle processing from its point of interruption. Current batch processing techniques involve business rules that are hardcoded in modules. Therefore, implementing trivial/small enhancements to applications tend to become time-consuming and tedious. The resulting data jobs, such as billing, require reloading the data in the underlying tables and restarting the batch cycle. Such activity is often prone to user errors.

In order to address these problems and more, embodiments of the present disclosure introduce an event-driven batch process that is capable of providing users with granular operational access to data jobs within each cycle. In particular, embodiments of the present disclosure allow for processing data jobs (records) with no little to no manual intervention by leveraging the synergy between the attributes, the resources, and operational access parameters associated with the processing of the records. Data jobs, such as billing events, may be generated as a part of user-initiated actions as well as the triggers created by batch processing. The rules, e.g., features, are no longer hardcoded, but are rather externalized and stored in databases that can be accessed when required. The batch process utilizes event architecture to automate any/all types of functionalities to accomplish the objectives. By structuring the information required to process records in a batch cycle to be available in external databases, the present disclosure facilitates pausing, canceling, restarting and even reprocessing events using point-in-time parameters with a greater ability to debug and correct.

Accordingly, the present disclosure, (i) Retrieves, from feature databases, specific attributes to process records (e.g., data jobs) associated with a first batch cycle. The attributes may include an account attribute, grouping information, artifact information, and/or scheduling information, (ii) Retrieves, from configuration databases, resources associated with the one or more records. The configuration databases may include event driver database, a billing guideline database, and/or an event configuration database, (iii) Generates a dashboard interface for the one or more records. The dashboard interface includes the attributes, the resources, and operational access parameters associated with the processing of the records. Each record may be processed based on at least a processing type, such as new enrollments, terminations, manual entry, adjustments, bulk uploads, and/or regular processing. The operational access parameters may include specific actions available to the user that allows for granular access to the batch billing cycle. The status associated with processing of a record may include an indication whether the record is yet to be processed (pending), currently being processed (pending), has already been processed (closed), or if the processing of a specific record was canceled by the user (canceled), (iv) Provides, to a user input device associated with a user, the dashboard interface. The user may use the dashboard interface to manually interrupt the processing of a record (e.g., first record). The user may toggle between various operational access parameters that are available for each record to affect a change in the processing of the records. The user may manually interrupt the processing of a particular record, while the rest of the records in the batch cycle continue to process. Automatically updates a status associated with the processing of the first record to reflect manual intervention from the user. For example, if the user has temporarily stopped the processing of a record, the status may reflect the processing of the record as "canceled." The status of the processing may also reflect manual intervention by the user.

What is more, the present disclosure provides a technical solution to a technical problem. As described herein, the technical problem includes a lack of operational access to bat processing data jobs. The technical solution presented herein allows for granular operational access to records being processed in a batch. In particular, present disclosure is an improvement over existing solutions concerning pausing, canceling, restarting, and even reprocessing data jobs being processed in a batch. The present disclosure reducing the amount of computing resources, such as processing resources, storage resources, network resources, and/or the like, that are being used by providing granular access to modify each data job instead of waiting for the entire batch cycle to run and then restarting the cycle with modified attributed. Furthermore, by removing manual input and waste from the implementation of the solution, the present disclosure improves speed and efficiency of the process and conserves computing resources. Furthermore, the technical solution described herein uses a rigorous, computerized process to perform specific tasks and/or activities that were not previously performed. In specific implementations, the technical solution bypasses a series of steps previously implemented, thus further conserving computing resources.

FIGS. 1A-1C illustrate technical components of an exemplary distributed computing environment for event-driven batch processing with granular operational access 100, in accordance with an embodiment of the disclosure. As shown in FIG. 1A, the distributed computing environment 100 contemplated herein may include a system 130, an end-point device(s) 140, and a network 110 over which the system 130 and end-point device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

In some embodiments, the system 130 and the end-point device(s) 140 may have a client-server relationship in which the end-point device(s) 140 are remote devices that request and receive service from a centralized server, i.e., the system 130. In some other embodiments, the system 130 and the end-point device(s) 140 may have a peer-to-peer relationship in which the system 130 and the end-point device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

The end-point device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

It is to be understood that the structure of the distributed computing environment and its components, connections and relationships, and their functions, are meant to be exemplary only, and are not meant to limit implementations of the disclosures described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the disclosure. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, the system 130 may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the end-point device(s) 140, in accordance with an embodiment of the disclosure. As shown in FIG. 1C, the end-point device(s) 140 includes a processor 152, memory 154, an input/output device such as a display 156, a communication interface 158, and a transceiver 160, among other components. The end-point device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the end-point device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the end-point device(s) 140, such as control of user interfaces, applications run by end-point device(s) 140, and wireless communication by end-point device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of end-point device(s) 140 with other devices. External interface 168 may provide, for example, for wired communication in some implementations, or for wireless communication in other implementations, and multiple interfaces may also be used.

The memory 154 stores information within the end-point device(s) 140. The memory 154 can be implemented as one or more of a computer-readable medium or media, a volatile memory unit or units, or a non-volatile memory unit or units. Expansion memory may also be provided and connected to end-point device(s) 140 through an expansion interface (not shown), which may include, for example, a SIMM (Single In Line Memory Module) card interface. Such expansion memory may provide extra storage space for end-point device(s) 140 or may also store applications or other information therein. In some embodiments, expansion memory may include instructions to carry out or supplement the processes described above and may include secure information also. For example, expansion memory may be provided as a security module for end-point device(s) 140 and may be programmed with instructions that permit secure use of end-point device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the end-point device(s) 140 to transmit and/or receive information or commands to and from the system 130 via the network 110. Any communication between the system 130 and the end-point device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the end-point device(s) 140 may provide the system 130 (or other client devices) permissioned access to the protected resources of the end-point device(s) 140, which may include a GPS device, an image capturing component (e.g., camera), a microphone, and/or a speaker.

The end-point device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation—and location-related wireless data to end-point device(s) 140, which may be used as appropriate by applications running thereon, and in some embodiments, one or more applications operating on the system 130.

The end-point device(s) 140 may also communicate audibly using audio codec 162, which may receive spoken information from a user and convert the spoken information to usable digital information. Audio codec 162 may likewise generate audible sound for a user, such as through a speaker, e.g., in a handset of end-point device(s) 140. Such sound may include sound from voice telephone calls, may include recorded sound (e.g., voice messages, music files, etc.) and may also include sound generated by one or more applications operating on the end-point device(s) 140, and in some embodiments, one or more applications operating on the system 130.

Various implementations of the distributed computing environment 100, including the system 130 and end-point device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a method for event-driven batch processing with granular operational access, in accordance with an embodiment of the disclosure. As shown in block 202, the method includes retrieving, from one or more feature databases, one or more attributes to process one or more records associated with a first batch cycle. As used herein, records may refer to specific data jobs, e.g., account billing, that are executed using the batch process. In some embodiments, the attributes may include at least an account attribute, grouping information, artifact information, and/or scheduling information.

Next, as shown in block 204, the method includes retrieving, from one or more configuration databases, one or more resources associated with the one or more records. In some embodiments, the configuration databases may include event driver database, a billing guideline database, and/or an event configuration database. As described herein, by structuring the information required to process records in a batch cycle to be available in external databases, the present disclosure facilitates pausing, canceling, restarting, and reprocessing events using point-in-time parameters with a greater ability to debug and correct.

Next, as shown in block 206, the method includes generating a dashboard interface for the one or more records, wherein the dashboard interface comprises the one or more attributes, the one or more resources, and one or more operational access parameters associated with the processing of the one or more records. In some embodiments, the operational access parameters may include specific actions available to the user that allows for granular access to the batch billing cycle. For example, the operational access parameters may include the ability to cancel the processing of specific records (data jobs) in the batch cycle.

In some embodiments, processing of a batch cycle may be initiated in response to an incidence of a trigger event. In such cases, the system may receive an incidence of a trigger event, and in response, may automatically initiate the first batch cycle to process the records. For each record, the system may generate a status associated with the processing. In one aspect, the status associated with processing of a record may include an indication whether the record is yet to be processed (pending), currently being processed (pending), has already been processed (closed), or if the processing of a specific record was canceled by the user (canceled) In some embodiments, each record may be processed based on at least a processing type. In one aspect, the processing type may include at least new enrollments, terminations, manual entry, adjustments, bulk uploads, and/or regular processing.

Next, as shown in block 208, the method includes providing, to a user input device associated with a user, the dashboard interface. In response to generating the dashboard interface, the system may provide the dashboard interface to the user to control the processing of specific records (data jobs) in the batch cycle. In some embodiments, as the records are processed, the corresponding status of their processing is automatically updated on the dashboard interface. In some embodiments, the user may use the dashboard interface to manually interrupt the processing of a record (e.g., first record). In this regard, the user may toggle between various operational access parameters that are available to the user for each record to affect a change in the processing of the records. In one aspect, the user may manually interrupt the processing of a particular record, while the rest of the records in the batch cycle continue to process. Once interrupted, the user may then modify specific aspects of the record, including any attributes and/or resources associated with the record. Then, the user may use the operational access parameters to either restart the processing of the record or continue processing the record from where it was interrupted, but with the modified parameters. In some embodiments, the record may be queued for processing until the rest of the records in the batch cycle are processed. In some embodiments, the system may automatically update a status associated with the processing of the first record to reflect manual intervention from the user. For example, if the user has temporarily stopped the processing of a record, the status may reflect the processing of the record as "canceled." In one aspect, the status of the processing may also reflect manual intervention by the user.

In some embodiments, in response to processing the records, the information associated with the processing may be stored in an event details database. In this regard, the system, in response to processing the records associated with the first batch cycle, may capture information associated with the processing of the one or more records, and store them in the event details database.

FIG. 3 illustrates a data flow diagram for event-driven batch processing with granular operational access, in accordance with an embodiment of the disclosure. As shown in FIG. 3, the system 130 may retrieve resources from configuration databases 304 (e.g., event driver database (ED_DB), a billing guideline database (BG_DB), and/or an event configuration database (EC_DB)), attributes 306 (e.g., an account attribute, grouping information, artifact information, and/or scheduling information), and processing types 302 (e.g., new enrollments, terminations, manual entry, adjustments, bulk uploads, and/or regular processing), and initiates batch cycles 308 accordingly. In this way, the batch process utilizes event architecture to automate any/all types of functionalities to accomplish the objectives. By structuring the information required to process records in a batch cycle to be available in external databases, the present disclosure facilitates pausing, canceling, restarting, and even reprocessing events using point-in-time parameters with a greater ability to debug and correct.

As will be appreciated by one of ordinary skill in the art, the present disclosure may be embodied as an apparatus (including, for example, a system, a machine, a device, a computer program product, and/or the like), as a method (including, for example, a business process, a computer-implemented process, and/or the like), as a computer program product (including firmware, resident software, microcode, and the like), or as any combination of the foregoing. Many modifications and other embodiments of the present disclosure set forth herein will come to mind to one skilled in the art to which these embodiments pertain having the benefit of the teachings presented in the foregoing descriptions and the associated drawings. Although the figures only show certain components of the methods and systems described herein, it is understood that various other components may also be part of the disclosures herein. In addition, the method described above may include fewer steps in some cases, while in other cases may include additional steps. Modifications to the steps of the method described above, in some cases, may be performed in any order and in any combination.

Therefore, it is to be understood that the present disclosure is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system for event-driven batch processing with granular operational access, the system comprising:
   a non-transitory storage device; and
   a processor coupled to the non-transitory storage device, wherein the processor is configured to:
   retrieve, from one or more feature databases, one or more attributes to process one or more records associated with a first batch cycle;
   retrieve, from one or more configuration databases, one or more resources associated with the one or more records;
   generate a dashboard interface for the one or more records, wherein the dashboard interface comprises the one or more attributes, the one or more resources, and one or more operational access parameters associated with the processing of the one or more records;
   provide, to a user input device associated with a user, the dashboard interface;
   receive, from the user input device and via a dashboard interface, a user input to manually interrupt a processing of a first record;
   interrupt the processing of the first record while continuing to process other records in the first batch cycle;
   receive, via the dashboard interface, a first user input modifying parameters of the interrupted first record;
   receive, via the dashboard interface, a second user input to restart the processing of the first record with the modified parameters;
   queue the first record with the modified parameters for processing in response to receiving the second user input;
   restart the processing of the first record with the modified parameters upon detecting a completion of processing the other records in the first batch cycle; and
   automatically update a status associated with the processing of the first record to reflect manual intervention from the user.

2. The system of claim 1, wherein the processor is further configured to:
   receive an incidence of a trigger event;
   automatically initiate the first batch cycle to process the one or more records; and
   generate a status associated with the processing of the one or more records.

3. The system of claim 2, wherein the processor is further configured to:
   update the dashboard interface in response to initiating the first batch cycle to indicate the status associated with the processing of the one or more records.

4. The system of claim 1, wherein the one or more configuration databases comprises at least an event driver database, a billing guideline database, and/or an event configuration database.

5. The system of claim 1, wherein the one or more attributes comprises at least an account attribute, grouping information, artifact information, and/or scheduling information.

6. The system of claim 1, wherein the processor is further configured to:
   process the one or more records associated with the first batch cycle;
   capture information associated with the processing of the one or more records; and
   store the information associated with the processing of the one or more records in an event detail database.

7. The system of claim 6, wherein, in processing the one or more records, the processor is further configured to:
   determine one or more processing types associated with the one or more records; and
   process the one or more records based on at least the associated processing type.

8. The system of claim 7, wherein the one or more processing types comprises at least new enrollments, terminations, manual entry, adjustments, bulk uploads, and/or regular processing.

9. A computer program product for event-driven batch processing with granular operational access, the computer program product comprising a non-transitory computer-readable medium comprising code causing an apparatus to:
   retrieve, from one or more feature databases, one or more attributes to process one or more records associated with a first batch cycle;
   retrieve, from one or more configuration databases, one or more resources associated with the one or more records;
   generate a dashboard interface for the one or more records, wherein the dashboard interface comprises the one or more attributes, the one or more resources, and one or more operational access parameters associated with the processing of the one or more records;
   provide, to a user input device associated with a user, the dashboard interface;
   receive, from the user input device and via a dashboard interface, a user input to manually interrupt a processing of a first record;
   interrupt the processing of the first record while continuing to process other records in the first batch cycle;

receive, via the dashboard interface, a second user input to restart the processing of the first record with the modified parameters;

queue the first record with the modified parameters for processing in response to receiving the second user input;

restart the processing of the first record with the modified parameters upon detecting a completion of processing the other records in the first batch cycle; and automatically update a status associated with the processing of the first record to reflect manual intervention from the user.

10. The computer program product of claim 9, wherein the apparatus is further configured to:

receive an incidence of a trigger event;

automatically initiate the first batch cycle to process the one or more records; and generate a status associated with the processing of the one or more records.

11. The computer program product of claim 10, wherein the apparatus is further configured to:

update the dashboard interface in response to initiating the first batch cycle to indicate the status associated with the processing of the one or more records.

12. The computer program product of claim 9, wherein the one or more configuration databases comprises at least an event driver database, a billing guideline database, and/or an event configuration database.

13. The computer program product of claim 9, wherein the one or more attributes comprises at least an account attribute, grouping information, artifact information, and/or scheduling information.

14. The computer program product of claim 9, wherein the apparatus is further configured to:

process the one or more records associated with the first batch cycle;

capture information associated with the processing of the one or more records; and store the information associated with the processing of the one or more records in an event detail database.

15. The computer program product of claim 14, wherein, in processing the one or more records, the apparatus is further configured to:

determine one or more processing types associated with the one or more records; and process the one or more records based on at least the associated processing type.

16. The computer program product of claim 15, wherein the one or more processing types comprises at least new enrollments, terminations, manual entry, adjustments, bulk uploads, and/or regular processing.

17. A method for event-driven batch processing with granular operational access, the method comprising:

retrieving, from one or more feature databases, one or more attributes to process one or more records associated with a first batch cycle;

retrieving, from one or more configuration databases, one or more resources associated with the one or more records;

generating a dashboard interface for the one or more records, wherein the dashboard interface comprises the one or more attributes, the one or more resources, and one or more operational access parameters associated with the processing of the one or more records;

providing, to a user input device associated with a user, the dashboard interface;

receiving, from the user input device and via a dashboard interface, a user input to manually interrupt a processing of a first record;

interrupting the processing of the first record while continuing to process other records in the first batch cycle;

receiving, via the dashboard interface, a second user input to restart the processing of the first record with the modified parameters;

queuing the first record with the modified parameters for processing in response to receiving the second user input;

restarting the processing of the first record with the modified parameters upon detecting a completion of processing the other records in the first batch cycle; and automatically updating a status associated with the processing of the first record to reflect manual intervention from the user.

18. The method of claim 17, wherein the method further comprises:

receiving an incidence of a trigger event;

automatically initiating the first batch cycle to process the one or more records; and generating a status associated with the processing of the one or more records.

* * * * *